United States Patent [19]

Butler

[11] Patent Number: 5,116,130
[45] Date of Patent: May 26, 1992

[54] RING LASER GYROSCOPE MOUNT

[75] Inventor: Alfred L. Butler, Thousand Oaks, Calif.

[73] Assignee: Litton Systems, Inc., Beverly Hills, Calif.

[21] Appl. No.: 607,453

[22] Filed: Oct. 31, 1990

[51] Int. Cl.⁵ .................................. G01C 19/68
[52] U.S. Cl. .................................... 356/350
[58] Field of Search ........................ 356/350

[56] References Cited

U.S. PATENT DOCUMENTS

| | | | |
|---|---|---|---|
| 4,115,004 | 9/1978 | Hutchings | 356/106 |
| 4,267,995 | 5/1981 | McMillan | 248/74 |
| 4,299,363 | 11/1981 | Datschefski | 248/56 |
| 4,411,527 | 10/1983 | Gamertsfelder | 356/350 |
| 4,425,040 | 1/1984 | Ljung | 356/350 |
| 4,436,423 | 3/1984 | Kumar | 356/350 |
| 4,634,091 | 1/1987 | Butler | 248/637 |
| 4,771,644 | 9/1988 | Meron | 74/5.22 |
| 4,779,985 | 10/1988 | Wirt | 356/350 |
| 4,790,657 | 12/1988 | Kozma | 356/350 |
| 4,890,812 | 1/1990 | Chechile | 248/674 |

OTHER PUBLICATIONS

Multioscillator Laser Gyros; Weng W. Chow et al.; IEEE Journal of Quantum Electronics, vol. QE-16, No. 9, Sep. 1980.

Primary Examiner—Samuel A. Turner
Assistant Examiner—LaCharles P. Keesee
Attorney, Agent, or Firm—L. David Rish; M. Michael Carpenter

[57] ABSTRACT

Disclosed herein is a Ring Laser Gyroscope Mount comprising a low coefficient of expansion metal Invar sleeve and mount coupler. The sleeve may be secured to the gyroscope pedestal by being screwed and affixed to a relatively high coefficient of thermal expansion material pedestal, such as HyMu 80. The sleeve is attached also to the glass frame by cementing it at selected locations within the central mounting aperture of the gyroscope frame. This securement procedure makes the assembly stiffer in directions perpendicular to the axis of the coupler. At least one concentric groove which surrounds the coupler is machined into at least one side of the frame to reduce stress at gyroscope mirror surfaces during thermal excursions. The clearance gap where the cement is placed, the groove depth and shape, and the sleeve and coupler are designed to be stiff but not induce distortion.

7 Claims, 5 Drawing Sheets

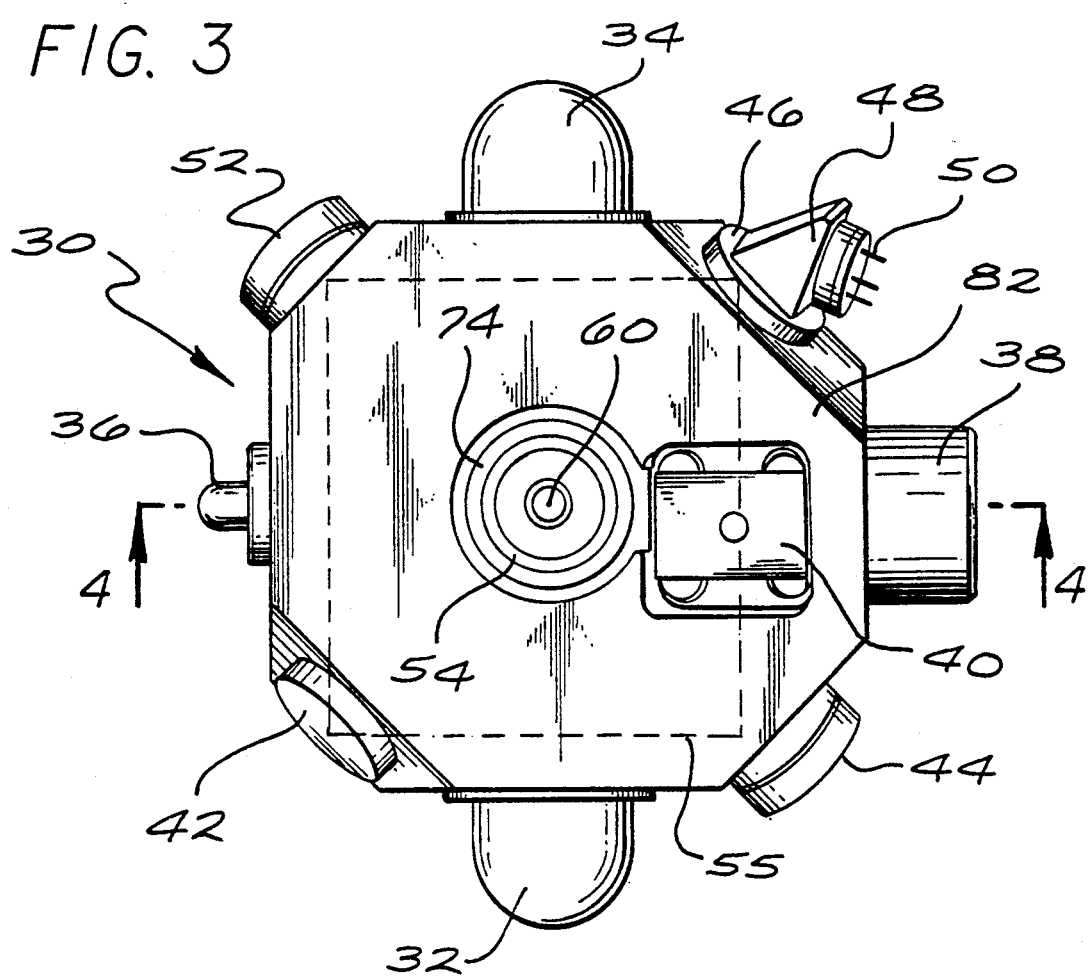
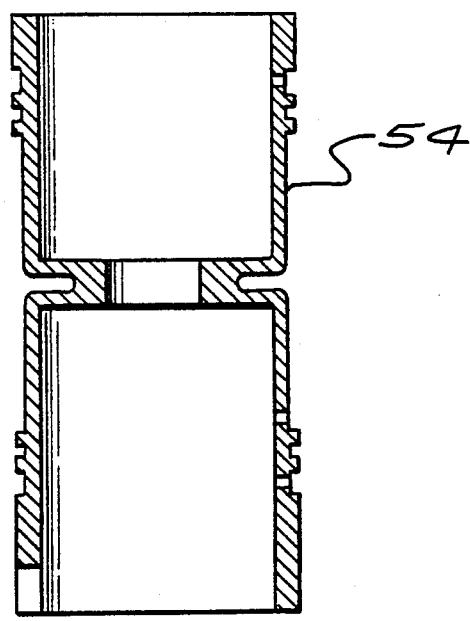

RING LASER GYROSCOPE MOUNT

BACKGROUND OF THE INVENTION

1. Field of the Invention

This invention relates to ring laser gyroscope mounting devices, and more particularly to a ring laser gyroscope mount which is thermally compensated, in a very small space, to accommodate thermal changes and shock vibrations to the gyroscope frame, such that the performance of the gyroscope is relatively immune from such external forces and temperature related changes.

2. Description of Related Art

Ring laser gyroscopes are an alternative form of rotation sensors which do not require the use of a spinning mass characteristic of a mechanical gyroscope. A ring laser gyroscope employs a Sagnac effect to detect rotation optically, as an alternative to the inertial principles upon which a mechanical gyroscope operates. Planar ring laser gyroscopes, of both triangular and square geometries, have been used in inertial navigation systems and flight control systems regularly in both commercial and military aircraft. The primary advantage of the ring laser gyroscope over the spinning wheel mechanical gyroscope is its ability to withstand relatively large mechanical shock without permanent degradation of its performance. Because of this and other features the expected mean time between failures of most Ring Laser Gyroscope inertial navigation systems are several times longer than the mechanical gyroscopes they replace. The planar ring laser gyroscope was a first attempt at a non-mechanical truly strap-down inertial navigation system.

The earliest developed ring laser gyroscopes have two independent counter-rotating light beams or other electromagnetic propagation which travel within an optical ring cavity. In an ideal model of the ring laser gyroscope, these two light beams propagate in a closed loop with transit times that differ in direct proportion to the rotation rate of the loop about an axis perpendicular to the plane of the loop. However, when one steps away from the ideal model of two mode ring laser gyroscope operation, various sources of inaccuracy are observed.

The two mode ring laser gyroscope has heretofore been mechanically dithered in order to compensate for the error source effect known as lock-in. Even the most effective mechanically dithered ring laser gyroscope adds a noise component to the output of the ring laser which in turn reduces its ultimate accuracy. In an effort to achieve a fully optical ring laser gyroscope, the non-planar multi-mode ring laser gyroscope was developed to overcome the effects of mode locking without the need to dither. The term (multioscillator) refers to four modes of electromagnetic energy that propagates simultaneously in the cavity as opposed to the usual pair counter-propagating linearly polarized modes that exist in the conventional two mode gyroscope. A detailed discussion of the operation of the multi-oscillator laser gyroscope is presented in the article entitled "Multioscillator Laser Gyros" by Weng W. Chow, et. al., at pages 918-936, *IEEE Journal of Quantum Electronics.* Vol. QE-16, No. 9, Sep. 1980.

Although a multioscillator ring laser gyroscope provides a strap-down method of providing rotation measurement which is not subject to low rotation rate mode locking and therefore needs no dither mechanism, all ring laser gyroscopes are prone to optical pathlength changes due to thermal expansion of the gyroscope frame. Due to the multiplicity of their applications, ring laser gyroscopes are required to operate over a wide temperature range, such as $-55°$ C. to $+70°$ C. It is important that ring laser blocks used in ring laser gyroscopes neither translate nor rotate with changes in temperature, for errors can be introduced over such a wide thermal range.

When a substance is subjected to a rise in temperature, its increase in length $\Delta l$) is very nearly proportional to its initial length (l) and to the rise in temperature ($\Delta T$). If the initial and final lengths are respectively $l_1$ and $l_2$, and $\alpha$ is a proportionality constant, then, the change in length may be shown to be, $$\Delta l = l_2 - l_1 = \alpha l_1 \Delta T$$

and the final length may be shown to be, $$l_2 = l_1 + \alpha l_1 \Delta T = l_1(l + \alpha \Delta T)$$

where $\alpha$ is called the coefficient of linear expansion and depends on the substance or material that is subjected to a temperature change ($\Delta T$). The coefficient of linear expansion, $\alpha$, is then the change in length per unit length per degree change in Temperature (measured normally in $°C.^{-1}$ or reciprocal Centigrade Degrees).

Typically, the ring laser gyroscope frame 82 (FIG. 3) is supported by mounts or supports fabricated of material having a different (higher) thermal coefficient of expansion than the block itself, which typically is made of low expansion material in order to maintain the integrity of length the optical pathway 55. The mounts or supports may be made from Invar, while these sleeves are mounted on Mu-Metal pedestals. The block or gyroscope frame is typically made from low expansive Zerodur ® Glass. Because of the difference between the coefficients of thermal expansion of the frame and support elements, there is a tendency for the support elements to transmit thermal induced forces or torques to the frame. Such forces or torques can internally stress the block, causing misalignment of the optical components or the block, due to the change in optical pathway length. This problem occurs because of the near zero coefficient of thermal expansion of the frame and the relatively high coefficient of thermal expansion of the metal pedestal. The connection between the frame and mounting elements must be both stiff and stable, and the misalignment of optical components cannot be tolerated if gyroscope accuracy and precision is to be preserved.

The mounting system shown in U.S. Pat. No. 4,634,091 (assigned to the common assignee of this application) provides a suitable connection between the frame and mounting elements which meet the requirements of both stiffness and stability. However, the mounting design disclosed in the '091 patent may require more space than is available on some laser gyroscopes. This is the case for the multioscillator ring laser gyroscope. Only a hole of less than one inch could be allotted for the mounting hole. Such requirements for a stiff and stable mounting element, which takes up such little space, may be inadequate for the small gyroscope specification application.

FIG. 1 shows another prior configuration of a ring laser gyroscope mounting assembly. This ring laser gyroscope 10 comprises a case 14 which encloses and mounts the gyroscope frame 12 to the case 14 in a strap down configuration. Seated and securely affixed to within the central region of the frame 12 is a dither suspension 16 which includes a dither flexure 18 and a support ring 20. The support ring 20 (as described in U.S. Pat. No. 4,779,985, assigned to the common assignee of this application) has a plurality of vertically directed lengthwise slots parallel to the central axis of the support ring 20 which provide a controlled area of contact between the support ring 20 and the frame 12. The slots in the support ring 20 are arranged to permit the ring 20 to absorb thermal and mechanical stresses, preventing their transmission from the dither suspension 16 to the frame 12. A boss extends radially outward at each end of the ring 20 so that when the support ring is placed inside the cavity of the central region of the ring laser gyroscope frame, only the bosses of the ring 20 contact the frame. Flexible portions of the ring are formed by the lengthwise slots for preventing the transmission of thermal or mechanical forces between the frame 12 and dither suspension 16.

The design of FIG. 1 does not provide the flexibility for relieving stresses induced by temperature or shock, other than hoop stress, needed for the smaller area ring laser gyroscope.

SUMMARY OF THE INVENTION

What is needed is a design which provides a mechanism for mounting a ring laser gyroscope to the pedestal without causing distortion or stressing the mirrors. In the invention disclosed in this application, the laser assembly (which consists of a Zerodur frame, mirrors, and other components) is mounted onto the pedestal without causing distortion or stressing the ring laser gyroscope mirrors or other components. The invention is directed to a ring laser gyroscope mounting system, which includes a ring laser gyroscope having a resonant optical cavity formed in a ring configuration, where the ring configuration defines a closed optical path within a monolithic frame. The frame is affixed to a ring laser gyroscope mount. The mount or sleeve mounts the ring laser gyroscope frame on to the pedestal. The ring laser gyroscope mount or sleeve may have a closed tubular ring laser gyroscope coupler mount having a central compliance groove defining the waist of the coupler. At least one relief groove is defined and carved into the frame, the groove being concentric with and surrounding the coupler mount. The coupler is also securely affixed to said frame and said pedestal by cementing the sleeve to the inner diameter of the tubular aperture of the frame holding the sleeve. The ring laser gyroscope mount or sleeve may further include a cap screw for securing the coupler to the frame and pedestal. This screw may have a socket head pressed flush against at least one washer. The cap screw is then tightened as it is screwed into said pedestal in order to secure the coupler and sleeve assembly into the frame and onto the pedestal. A stabilizing pin may also be provided for preventing rotation of the coupler about its own axis within the central aperture of the ring laser gyroscope.

Another advantage of this invention is the relatively low cost of manufacture. Prior art designs required relatively close tolerances and intricate machining of Zerodur™ glass parts. In the present invention, intricate machining is required only on the metal mount or sleeve, considerably lowering the cost of manufacture. Metal is much easier to machine than low expansive glass and is less costly to replace than a new glass frame.

BRIEF DESCRIPTION OF THE DRAWINGS

FIG. 3 is a top view of the preferred embodiment of the ring laser gyroscope mount of this invention shown in FIG. 2.

FIG. 6 is a cross-sectional view of an isolated ring laser gyroscope mount and coupler 54.

DETAILED DESCRIPTION OF THE PREFERRED EMBODIMENT

Figure 1:
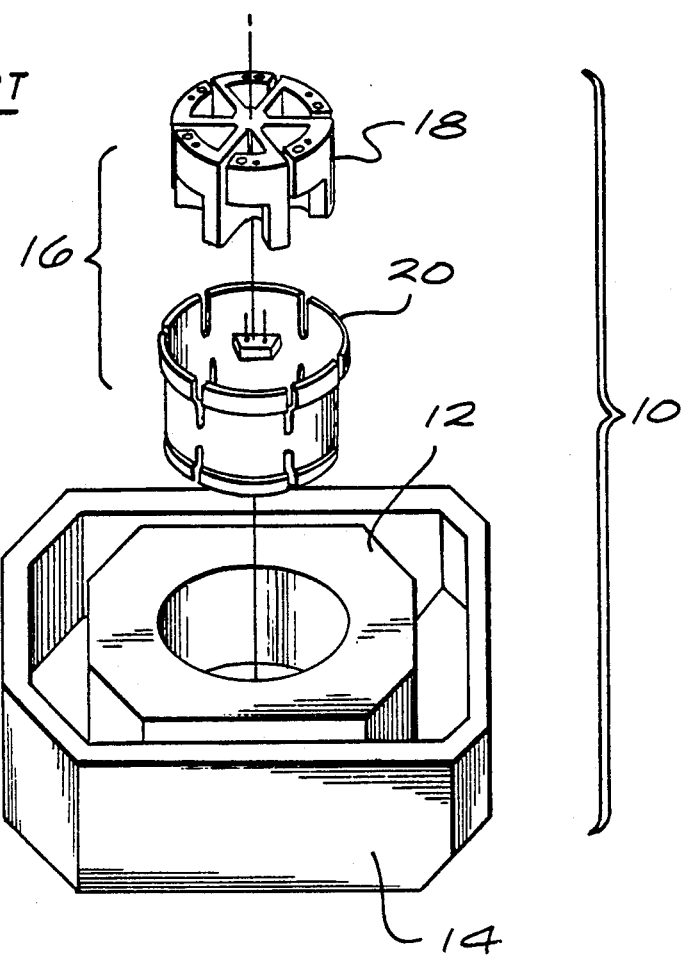
FIG. 1 is a PRIOR ART perspective view of a dither suspension system for a ring laser gyroscope for mounting into a gyroscope case.
Figure 2:
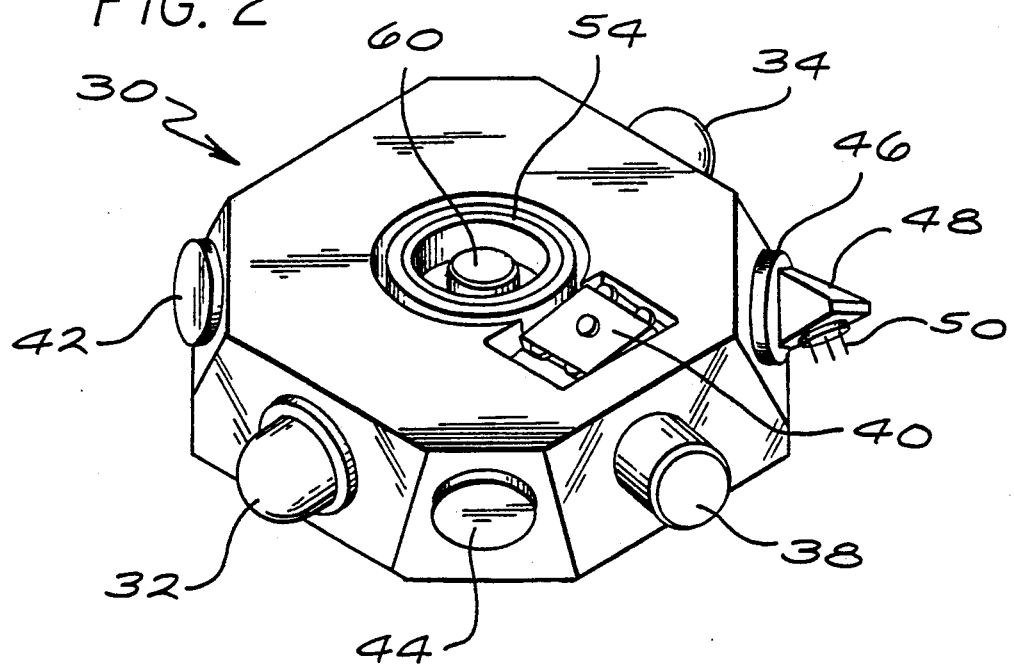
FIG. 2 is a perspective view of a preferred embodiment of the ring laser gyroscope mount of this invention for mounting a ring laser gyroscope onto a pedestal.

The preferred embodiment of this invention is shown in FIGS. 2 through 6 and consists of a low coefficient of expansion metal mount or (such as Invar) sleeve 54. This mount or sleeve 54 acts as a coupler mount connecting the gyroscope frame 82 to the support pedestal 56. In use in the ring laser Gyroscope 30 (of FIGS. 2 and 3) the mount or sleeve 54 is concentrically positioned at the central region of the gyroscope frame 82. The basic multi-oscillator ring laser gyroscope has an optical path 55 formed between four mirrors (FIG. 3).

Ring laser gyroscopes may have a gaseous active medium which is present in the optical pathway 55 between the four mirrors 42, 44, 46 and 52. This active medium may be powered up by the application of a high voltage D.C. current between each of the cathodes 32 and 34 and the anode 36 (FIG. 3), wherein such active medium is uniformly distributed between portions of the optical pathway 55.

The mirrors 42 and 44 are generally fixed, and one of these mirrors (46) may be semi-transparent in order to allow light to leave the resonator, pass onto a prism 48, and fall upon photodetectors 50 (external to the optical path 55) for signal processing in order measure rotation of the gyroscope. When the signals are subtracted during the electronic processing to remove the Faraday bias, the scale factor of the gyroscope is doubled over the conventional ring laser gyroscope. A Faraday element cover 40 (situated near the plug 38), covers a Faraday Rotator element 41 (of FIG. 4) that is also present in the optical path 55 in order to effectuate non-reciprocal splitting of pairs of left circularly polarized (LCP) and right circularly polarized (RCP) light beams. This Faraday Rotator element 41 may be secured to the gyroscope frame by the optical contacting of the rotator pedestal 39 to the bottom surface of the frame 82.

By mounting the Gyroscope 30 at its center within a case (such as illustrated in FIG. 1), this gyroscope instrument is positioned in a symmetric fashion to accurately measure rotation and equally distribute external shock or stress as well as expansion due to thermal changes.

Figure 4:
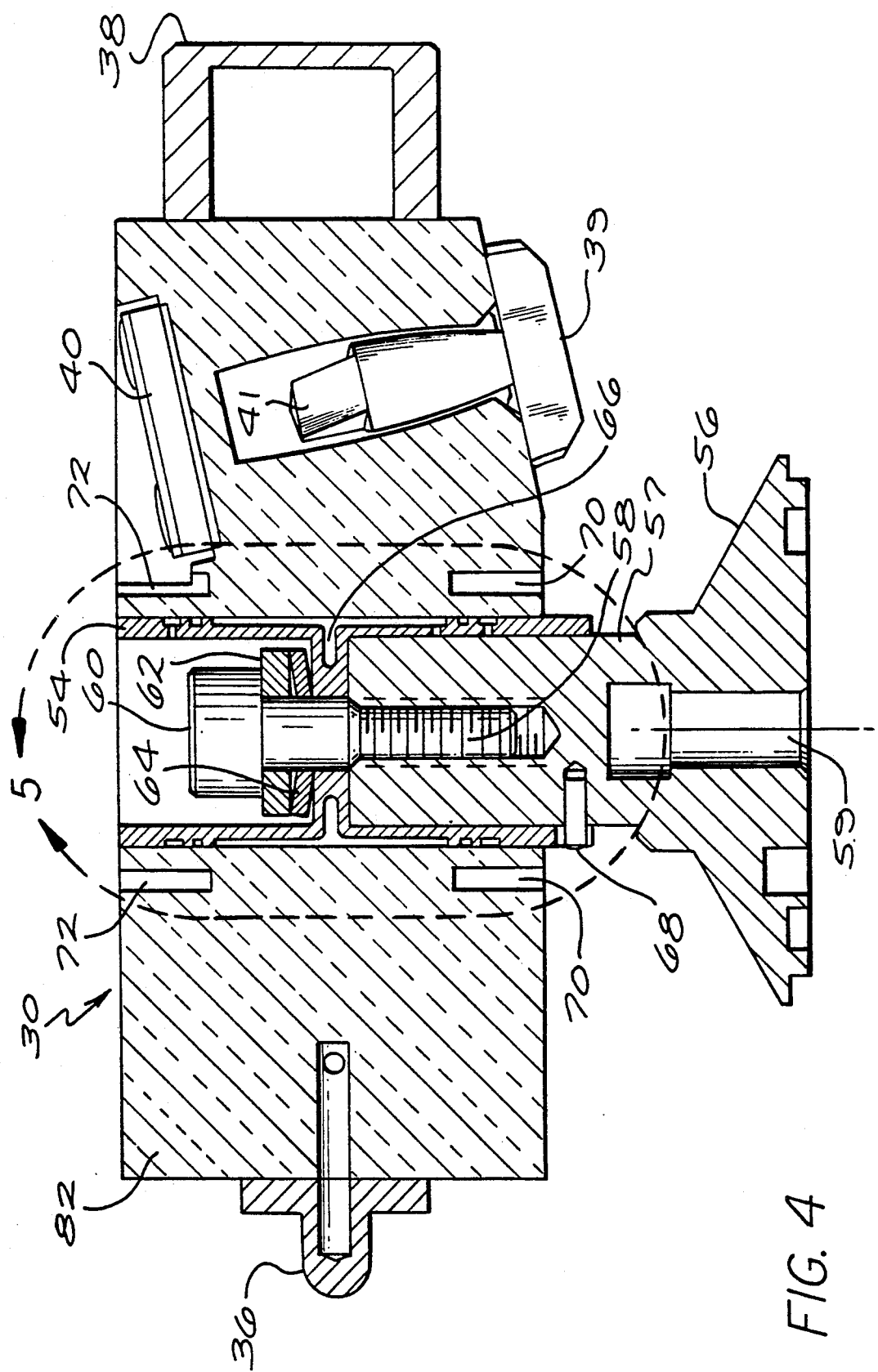
FIG. 4 is a cross-sectional view showing key elements of the preferred embodiment of this invention taken along line 4—4 of FIG. 3.
Figure 5:
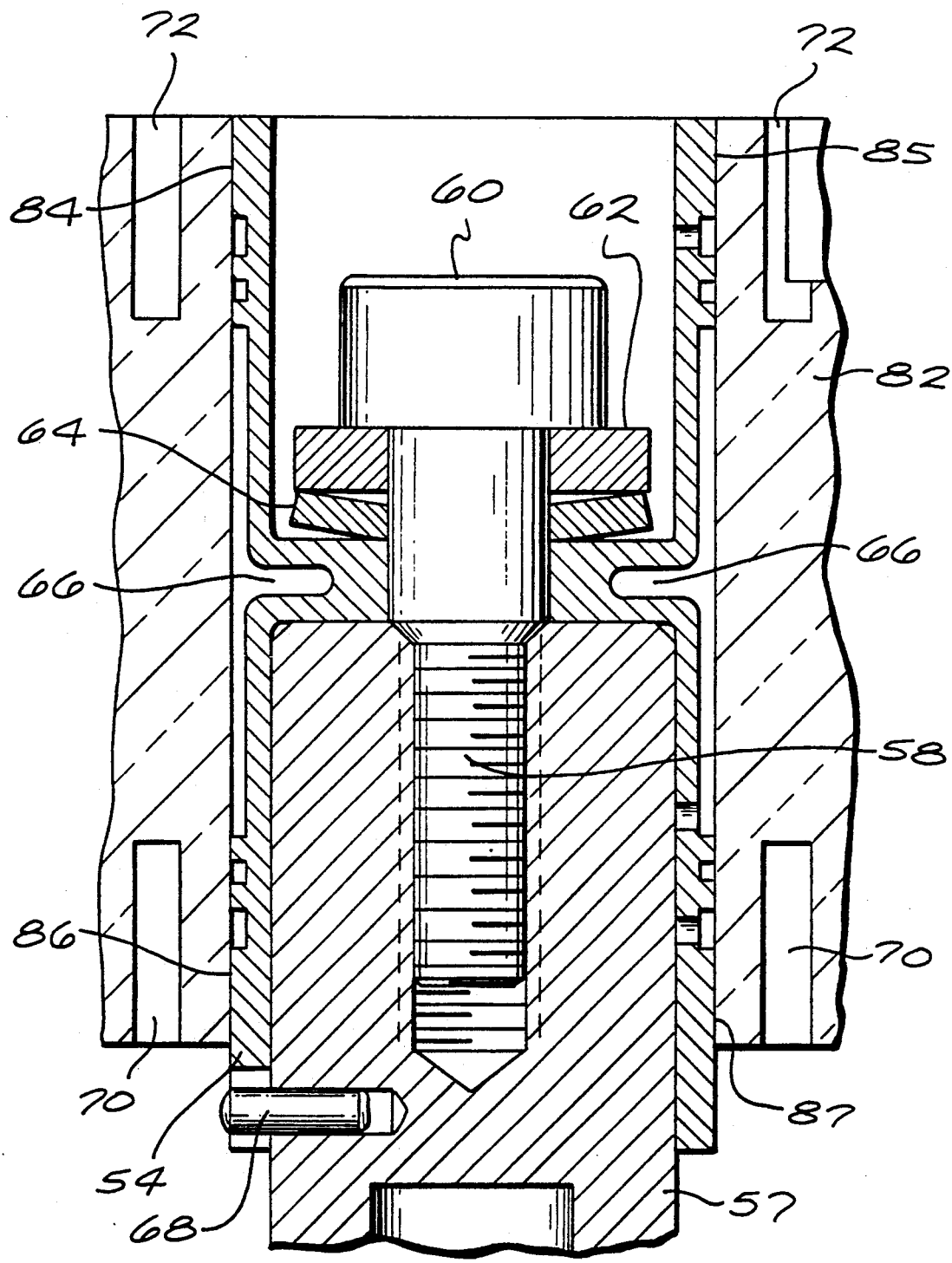
FIG. 5 is an enlarged cross-sectional view of the preferred embodiment of this invention defined by the dashed line "5" of FIG. 4.

As shown in FIGS. 4 and 5, the gyroscope frame 82 is strongly secured to the gyroscope mount 54, which in turn is fastened to the gyroscope pedestal stem 57 of the pedestal 56, whereby the gyroscope frame 82 may be secured through such a strap down configuration to a stable ring laser gyroscope case. Both a cap screw 58 (through an adjustment of the socket head 60) and a stabilizing pin 68 may be use to help secure the mount 54 to the pedestal 56 and stem 57. At the head of the cap screw 58 is the socket head 60, which may be adjusted to assure adjustable securement of the sleeve 54 to the pedestal stem 57. Generally a flat washer 62 may be positioned between the cap screw socket head 60 and the horizontal surface of the sleeve 54, which surface defines the compliance groove 66. Optionally, a conical spring washer 64 may also be interposed as illustrated in FIGS. 4 and 5.

This mount 54 is screwed down to the pedestal stem 57 (using a cap screw 58), which pedestal 56 and integral stem 57 are made from a relatively high coefficient of thermal expansion material. In the preferred embodiment, this material is HyMu 80. The pedestal may define a mount bore 59 for inserting a bolt (not shown) into the pedestal 56 for securing the gyroscope 30 to the side of a case, analogous to the case 14 of FIG. 1. FIG. 5 shows that the sleeve or mount 54 is attached to the Zerodur frame 82 by cementing it at those contact points 84, 85, 86, and 87 where the sleeve 54 contacts the inner diameter of the frame 82. By cementing the sleeve 54 to the gyroscope frame 82 where the sleeve contacts the frame 82 (at contact points 84 through 87), the entire mounting assembly (including the frame, sleeve, and pedestal) is torsionally stiffer in the directions perpendicular to the central vertical axis than if it were supported and cemented only in the center.

Relief grooves 70 and 72 are added to both the top and bottom sides of the frame 82 to reduce stress at the mirror surfaces during thermal excursions. Stress on the mirror surface may cause path misalignment or stress birefringence to which the multioscillator is highly sensitive. The clearance gap (cement area), the grooves (70 and 72) depth and shape, and the sleeve or mount 54 are designed to be stiff but not induce distortion. The grooves 70 and 72 should be fabricated at the same time the center bore which holds the sleeve 54 is done.

Figure 7:
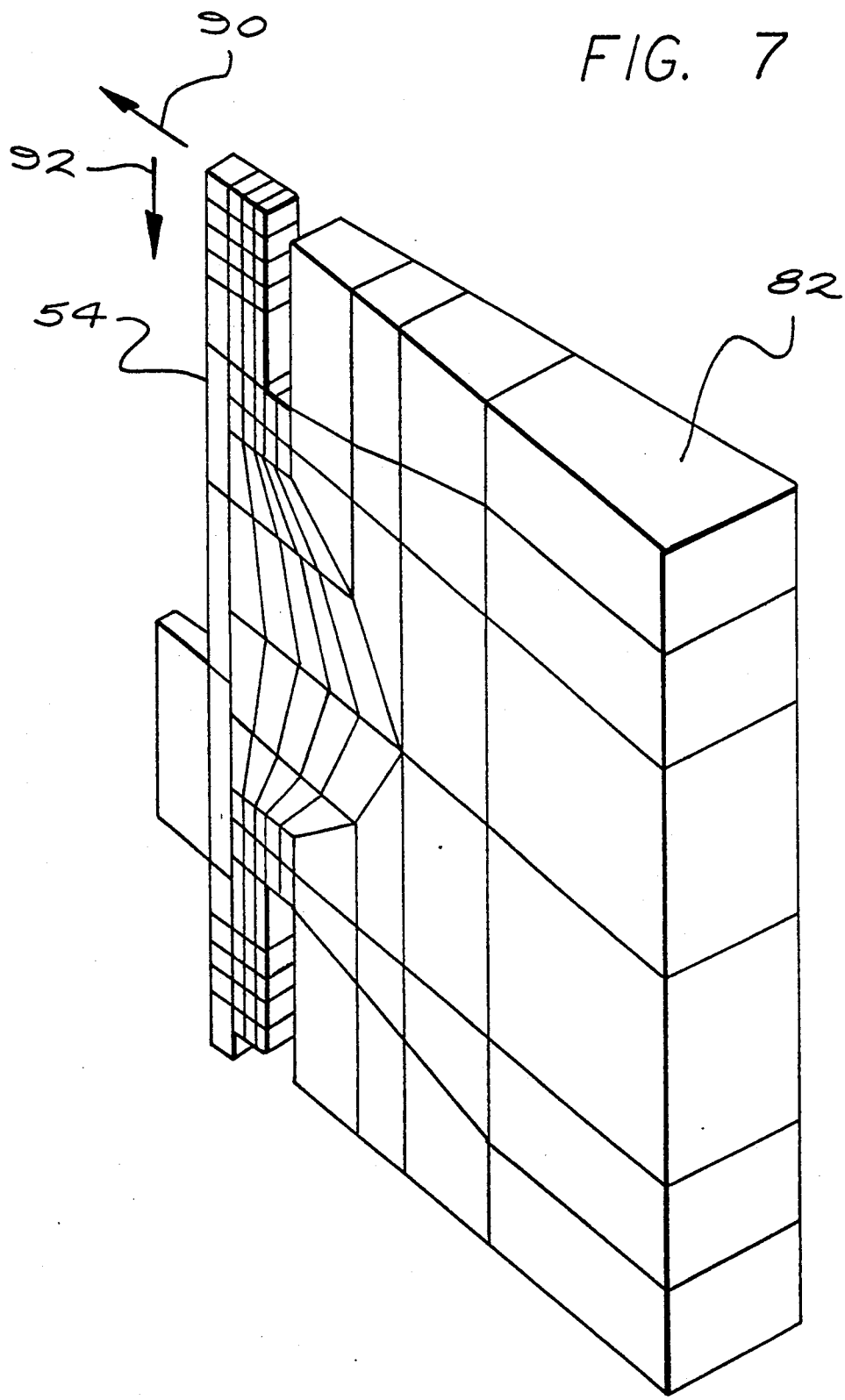
FIG. 7 is a three dimensional diagrammatic view showing stress analysis of the ring laser gyroscope mount system of this invention.

With reference to FIGS. 4, 5, and 7, the operation of the ring laser gyroscope mounting system can be seen with relation to how the system reacts to both thermal and vibrational stress. FIG. 7 shows the resultant stress (arrows 90 and 92) at the mount 54 and on the frame 82 body (made from the low coefficient of thermal activity material Zerodur ®). This stress may be due to vibrational or other mechanical shock or it is likely due to the greater expansion or contraction of the gyroscope mount 54 under thermal stress. The lower coefficient of thermal expansion mount tends to apply stress to the areas indicated by the arrows 90 and 92. Stresses are applied at horizontal surface compliance groove 66 of the sleeve 54 (FIG. 5) and at the relief grooves 70 and 72 (For example, arrows 90 and 92, associated with the relief groove of FIG. 7). Both these sets of compliance and relief grooves allow deformation or the sleeve 54 or a small circle of material 74 (FIG. 3) of the gyroscope frame 82, without the need to translate this stress in any significant manner to the optical pathway 55. In this manner the primary operation of the mounting sleeve 54, acting in conjunction with the relief grooves 70 and 72, is to assure alignment of the mirrors (42, 44, 46, and 52) and to assure that no stress is transmitted to the mirror reflective coating for proper and accurate ring laser gyroscope operation.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, any material exhibiting a relatively high coefficient of thermal expansion would be useful to act as the mounting or sleeve element 54 of the ring laser gyroscope mount of this invention. Also, while the mounting system and assembly of the disclosed invention may be preferably used in a multioscillator ring laser gyroscope, it is also useful for any ring laser gyroscope, any ring laser, or to stabilize a linear laser. Thus, alternate embodiments having substantially equivalent functions or structures are intended to be comprehended within the scope of the appended claims.

What is claimed is:

1. A ring laser gyroscope, comprising:
   a resonant optical cavity formed in a ring configuration, said ring configuration defining a closed optical path within a monolithic frame;
   a pedestal for supporting the monolithic frame;
   said frame affixed to a ring laser gyroscope mount means for mounting the ring laser gyroscope frame onto said pedestal;
   said ring laser gyroscope mount means including:
   a tubular ring laser gyroscope coupler mount having a central compliance groove defining the waist of the coupler;
   at least one relief groove defined into said frame, concentric with and surrounding said coupler mount;
   said coupler being securely affixed to said frame and said pedestal.

2. The ring laser gyroscope mount means of claim 1 further including:
   a cap screw for securing the coupler to the frame and pedestal, said screw having a socket head pressed flush against at least one washer, the screw being tightened as it is screwed into said pedestal; and,
   a stabilizing pin for preventing rotation of the coupler about its own axis within a central aperture of said ring laser gyroscope.

3. The ring laser gyroscope mount means of claim 1 wherein said coupler is securely affixed to said frame by cementing the coupler mount to the frame at selected contact points of contact, near the top and bottom of said frame and said coupler mount, between said coupler mount and said frame.

4. A ring laser gyroscope mounting system, comprising:
   a ring laser gyroscope frame including a closed optical pathway for measuring rotational rate and direction;
   a ring laser gyroscope coupler mount means for mounting said ring laser gyroscope frame in a strap down configuration within a ring laser gyroscope case;
   said mount means including vertically and horizontally directed complaint means positioned along said mount means and within said gyroscope frame;
   said compliant means operably associated with said mount means and said gyroscope frame such that any deformation originating in any direction of said compliant means due to mechanical or thermal stresses is not communicated to a mirror optical surface along the optical pathway of said gyroscope frame.

5. The ring laser gyroscope mounting system of claim 4, wherein said compliant means operably associated with said mount means further includes:
   a horizontally directed central compliance groove defining the waist of the mount means; and,
   at least one vertically directed relief groove cut into said gyroscope frame defining a small circle of material, surrounding said mount means;
   whereby, said compliant means prevents communication of any thermal or mechanical stress to said mirror optical surface along said optical pathway.

6. The ring laser gyroscope mounting system of claim 4, wherein:
   said mount means is securely fastened at selected locations, near the top and bottom of said frame, with cement along an inner surface of said ring laser gyroscope frame in order to integrate said mount means to said frame.

7. A method for mounting a ring laser gyroscope into a navigational system in a strap down configuration within a ring laser gyroscope case, comprising:
   cutting away portions of said ring laser gyroscope frame to form a central compliance groove defining the waist of a mount and cutting away at least one relief groove defined into said gyroscope frame which groove surrounds said mount with a circle of material, so that said gyroscope frame will be compliant and deform in either horizontally or vertically in response to mechanical or thermal stresses, preventing such stresses from being communicated to a mirror optical surface within said gyroscope frame;
   placing and securing a ring laser gyroscope frame onto a ring laser gyroscope coupler mount;
   securely fastening with cement at selected locations at the top and bottom of said frame said mount means along an inner surface of said ring laser gyroscope frame in order to integrate said mount means to said frame.

* * * * *